Figure 1:
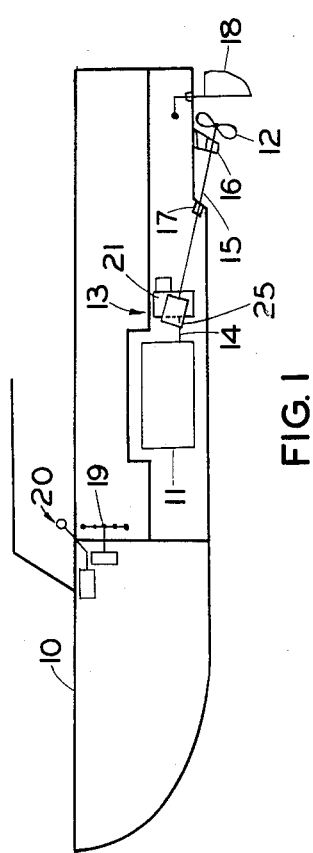

July 19, 1966  R. A. THOMAS ET AL  3,261,229
PROPULSION SYSTEM FOR A BOAT

Filed June 27, 1963  11 Sheets-Sheet 1

INVENTORS.
RUSSELL A. THOMAS.
DALLAS P. GRAHAM.
BY MAHONEY, MILLER & RAMBO.
BY *Wm. V. Milleratty*

July 19, 1966    R. A. THOMAS ETAL    3,261,229
PROPULSION SYSTEM FOR A BOAT
Filed June 27, 1963    11 Sheets-Sheet 3

INVENTORS.
RUSSELL A. THOMAS.
DALLAS P. GRAHAM.
BY MAHONEY, MILLER & RAMBO.
BY

July 19, 1966 R. A. THOMAS ETAL 3,261,229
PROPULSION SYSTEM FOR A BOAT
Filed June 27, 1963 11 Sheets-Sheet 4

INVENTORS.
RUSSELL A. THOMAS.
DALLAS P. GRAHAM.
BY MAHONEY, MILLER & RAMBO.

INVENTORS.
RUSSELL A. THOMAS.
DALLAS P. GRAHAM.
BY
MAHONEY, MILLER & RAMBO.

July 19, 1966 R. A. THOMAS ET AL 3,261,229
PROPULSION SYSTEM FOR A BOAT
Filed June 27, 1963 11 Sheets-Sheet 8

INVENTORS.
RUSSELL A. THOMAS.
DALLAS P. GRAHAM.
BY MAHONEY, MILLER & RAMBO.

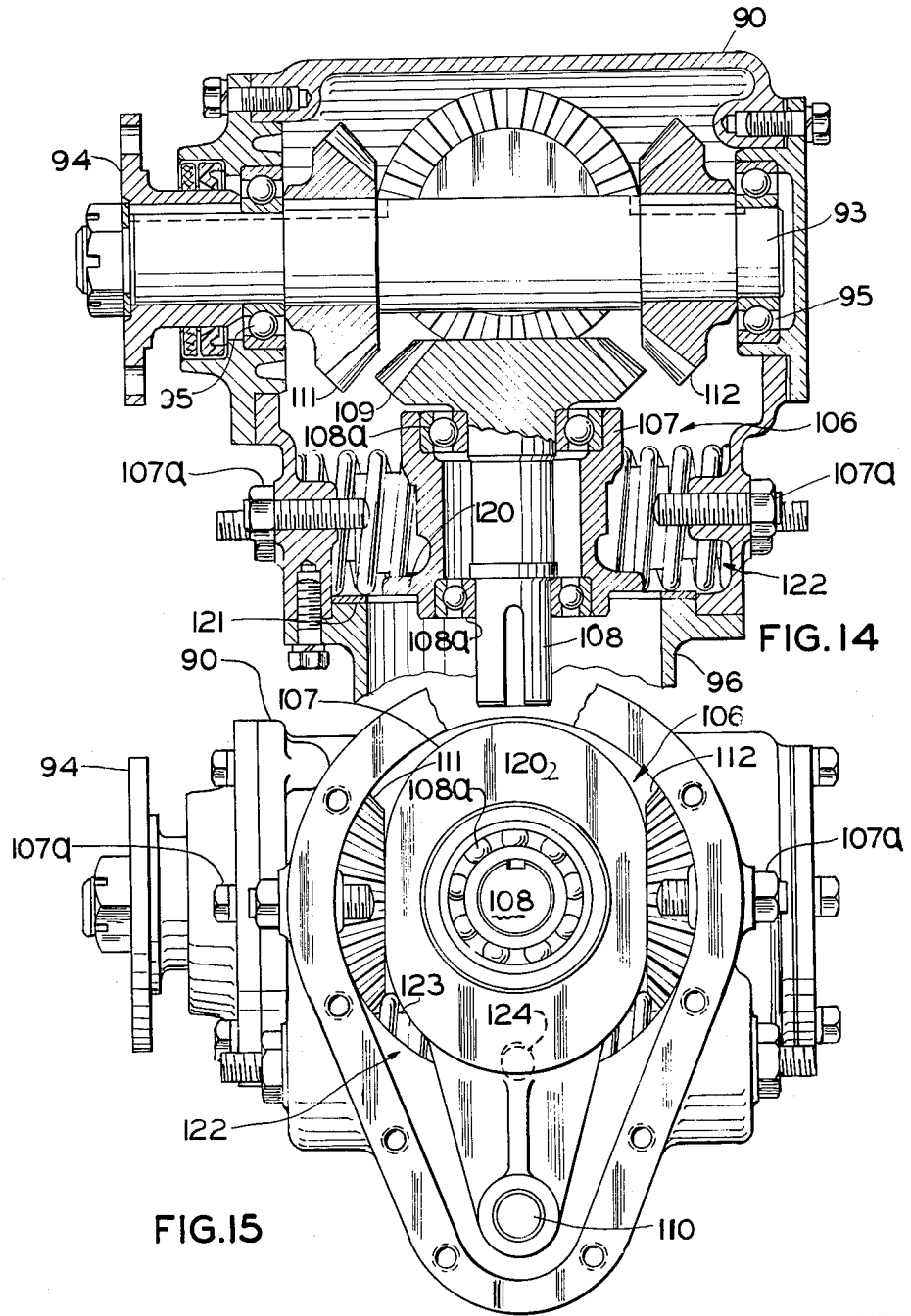

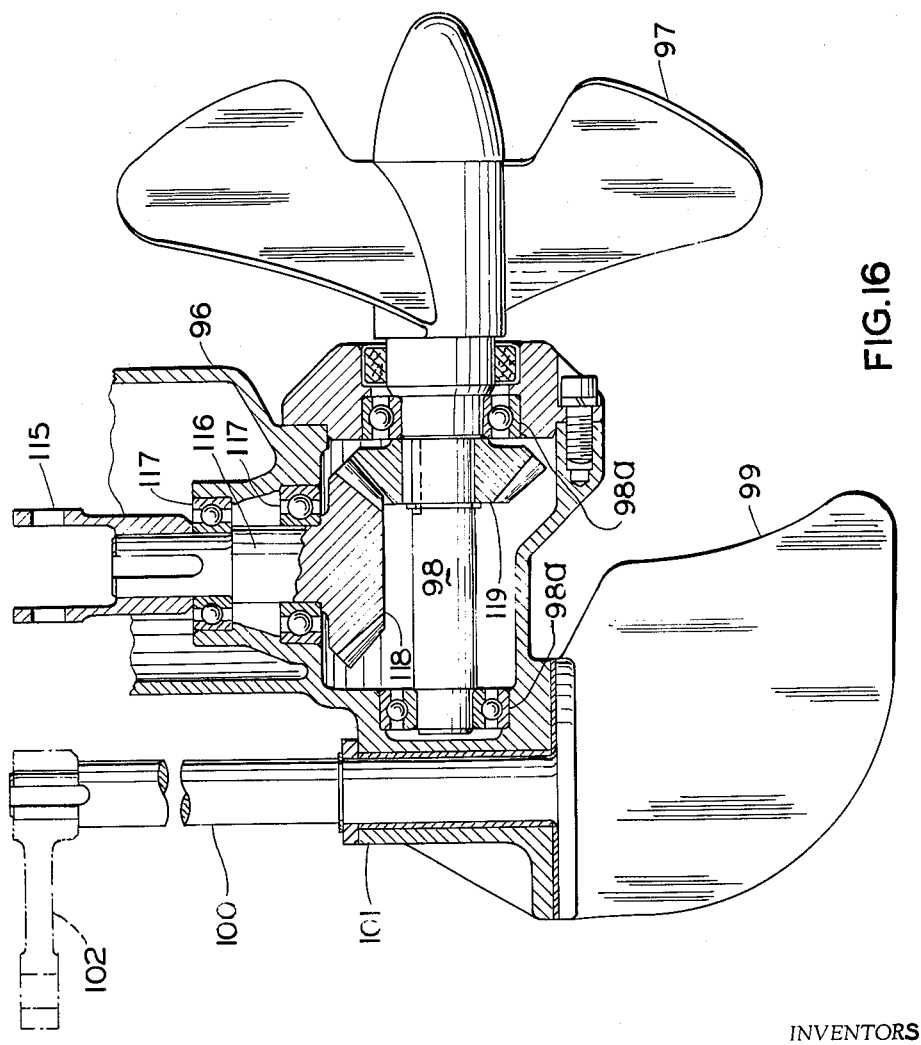

United States Patent Office 3,261,229
Patented July 19, 1966

3,261,229
PROPULSION SYSTEM FOR A BOAT
Russell A. Thomas, 406 Voeller Ave., Grove City, Ohio, and Dallas P. Graham, 2566 Wickliffe, Columbus, Ohio
Filed June 27, 1963, Ser. No. 291,086
3 Claims. (Cl. 74—665)

This invention relates, in general, to a propulsion system for a boat. It relates, more specifically, to a twin propeller drive operated by a single engine in which the propellers are independently operable to improve maneuverability.

In marine pleasure craft, it is a well known practice to utilize more than one propeller to enhance the performance characteristics. Two propellers permit more precise maneuvering at relatively slow speeds such as are utilized when approaching or leaving a dock. It is necessary that the propellers be independently operable, however, to obtain the required maneuverability as there must be provision for reversing or at least stopping one propeller while maintaining the other in forward. This has normally been accomplished by providing separate engines for each propeller. While this is a satisfactory solution to the problem as each engine may be controlled as desired, an inherent disadvantage of this arrangement is the difficulty encountered in subsequently synchronizing the engines when the craft is under way in open water. Without synchronization of the engines, the craft becomes difficult to handle requiring increased use of the rudder to offset the unequal thrust. Heretofore, another advantage of providing twin engines is the margin of safety thus afforded in the event of a malfunction occurring in one engine resulting in complete disablement thereof. This factor is declining in importance at the present time due the improved reliability of engines and their associated auxiliary equipment. Although a twin engine installation offers the advantages of maneuverability and a safety factor, the two engines are more expensive to operate in comparison to a single engine of a specific size. Both engines are customarily of the same size as the single engine required, thus providing an available power double that of the single engine, but the speed will be the same as if only one engine were propelling the boat. Since high power requirements are not essential in most instances where high maneuverability is desired, the advantage of increased power over a single engine of the same size is not of great importance. However, the use of two engines will increase the total fuel consumption and, consequently, increase the cost of operation.

It is the primary object of this invention to provide a propulsion system for marine craft having two propellers independently operable and driven by a single engine.

It is another object of this invention to provide a propulsion system having a novel gear mechanism for independent control of two propellers driven by a single engine by which each propeller may provide either forward or reverse thrust or be fully stopped irrespective of the operation of the other propeller.

It is a further object of this invention to provide a marine craft drive apparatus having a single engine driving a pair of propellers and a novel gear mechanism for interconnecting the engine with the propellers which permits independent control of each propeller and includes a pair of main drive gears that are alternately and selectively engageable by a gear carried by a shaft connected to each respective propeller.

It is also an object of this invention to provide a twin propulsion system which is economical to manufacture and install and is simple and economical to operate.

These and other objects and advantages of this invention will be readily apparent from the following detailed description and the accompanying drawings.

Figure 2:
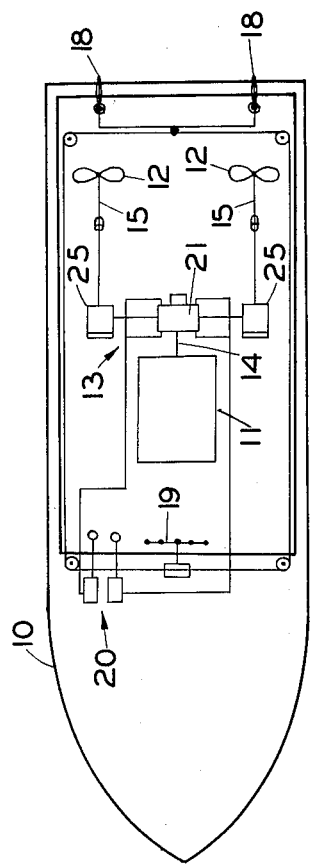
Figure 3:
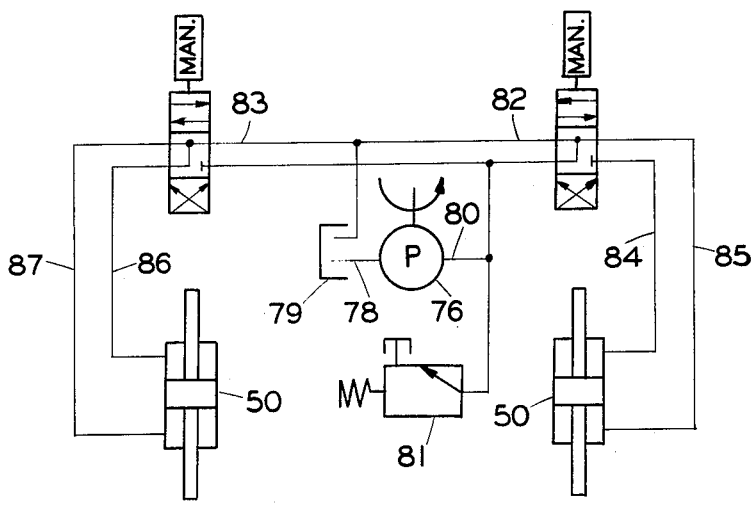
Figure 4:
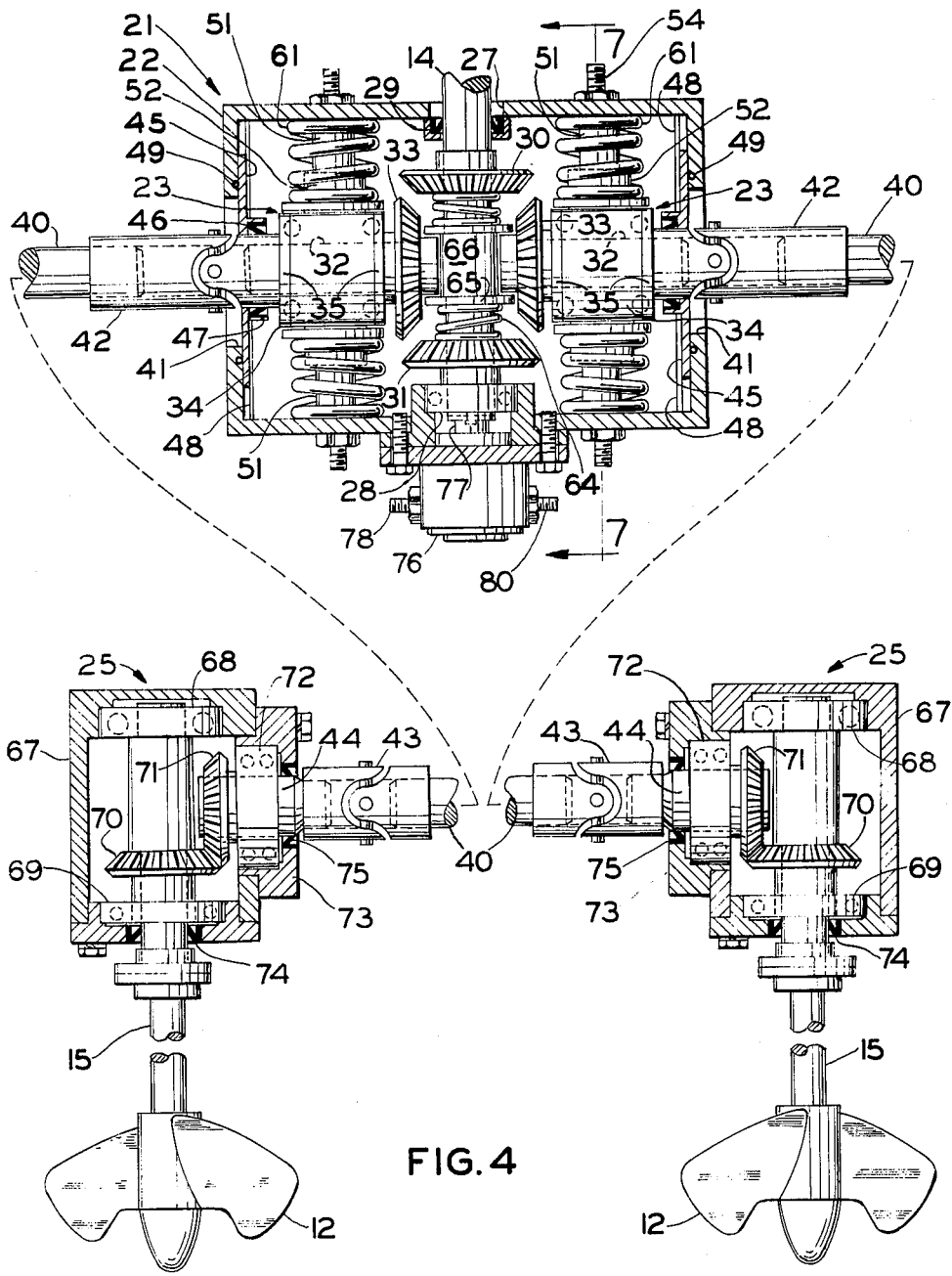
Figure 5:
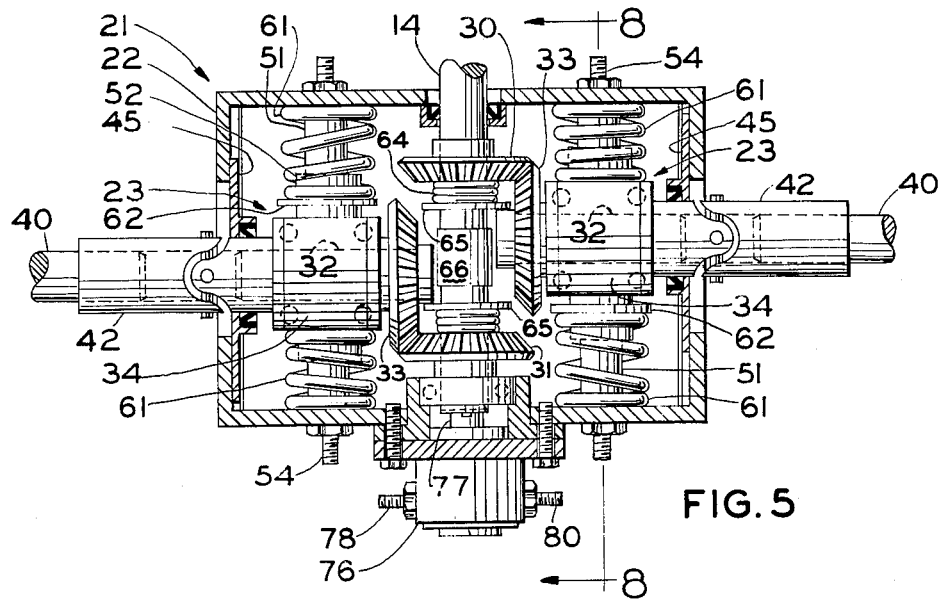
Figure 6:
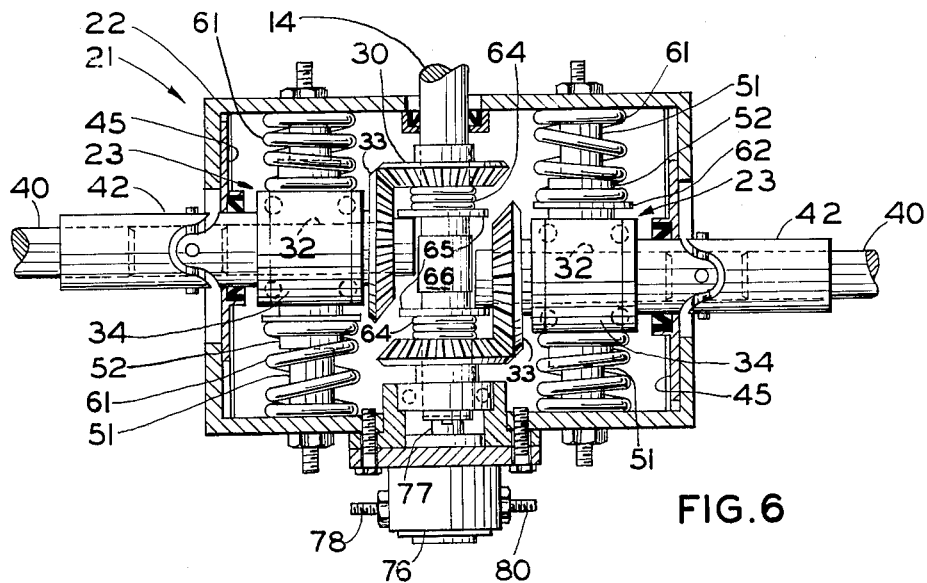
Figure 7:
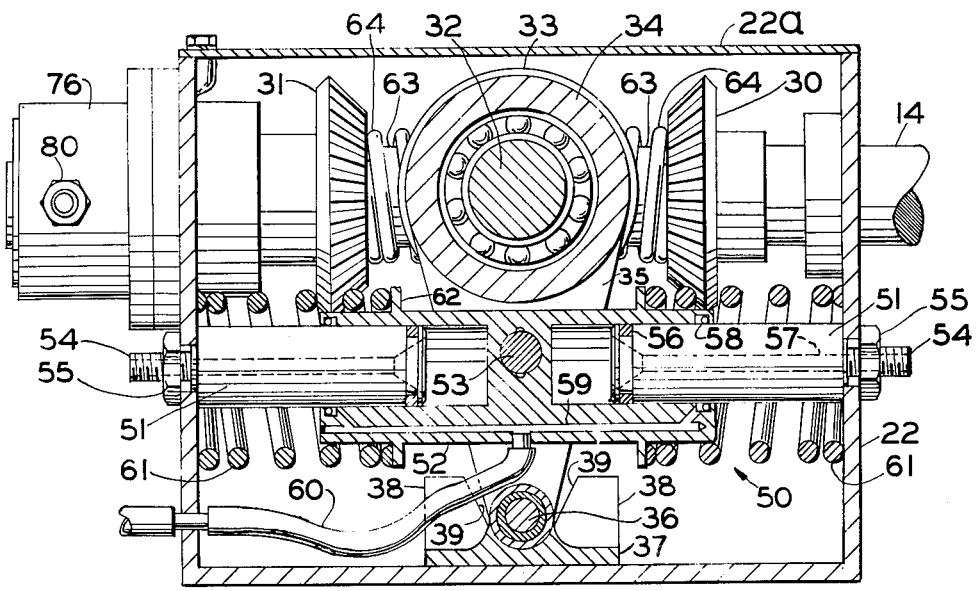
Figure 8:
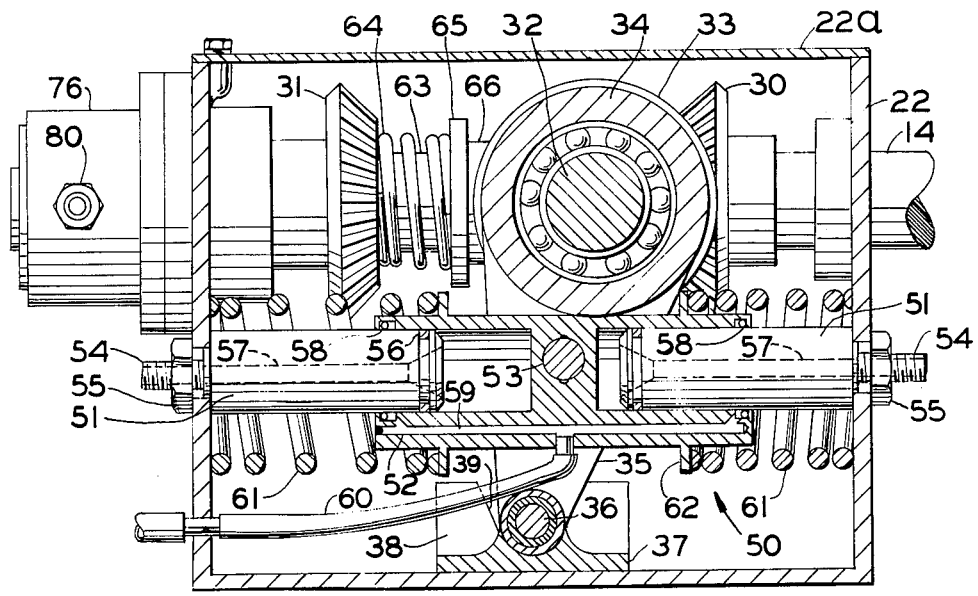
Figure 9:
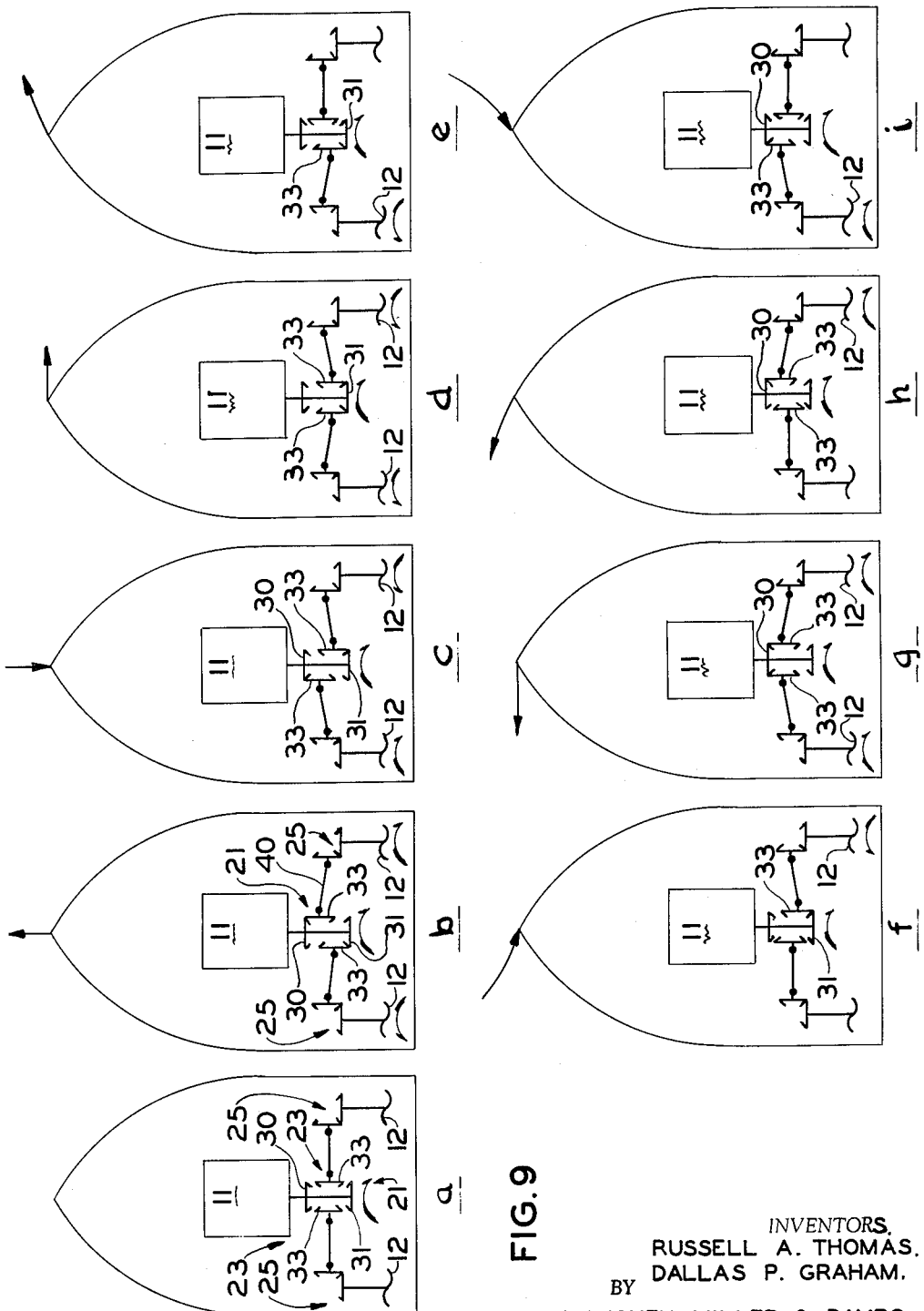
Figure 10:
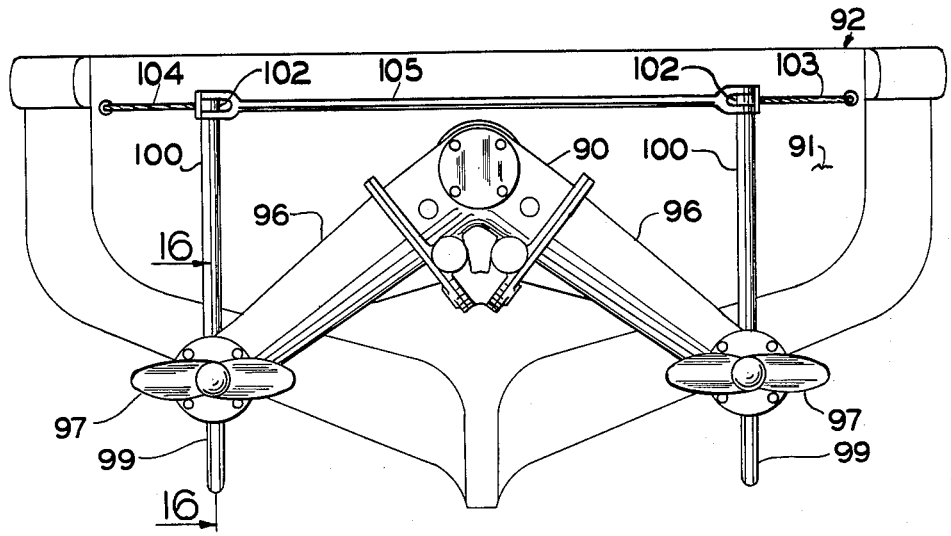
Figure 11:
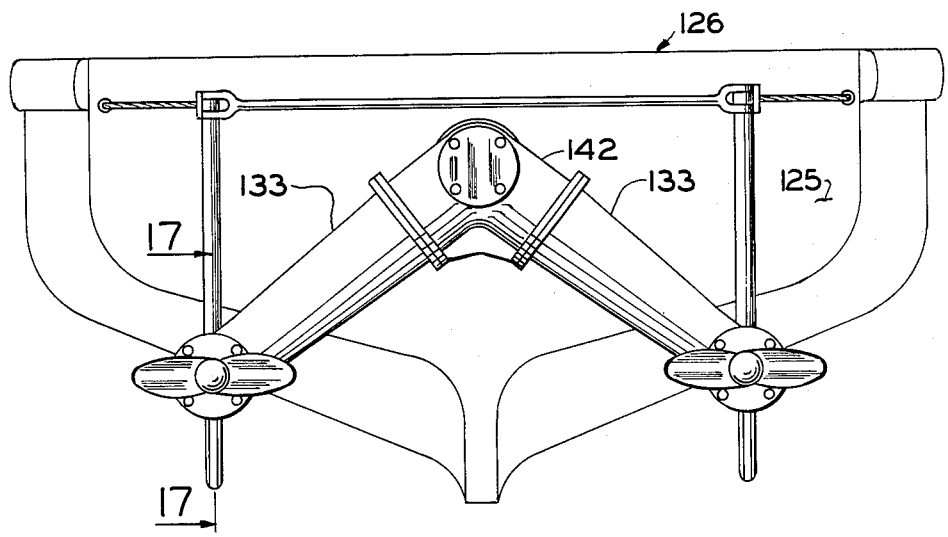
Figure 12:
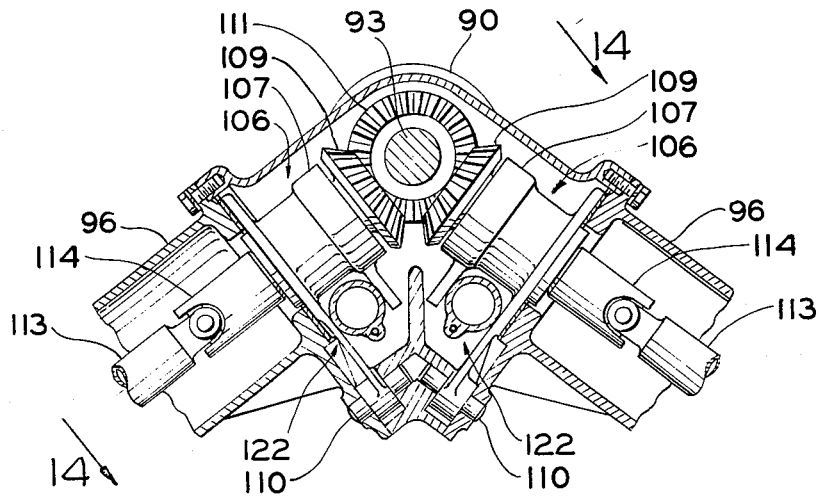
Figure 13:
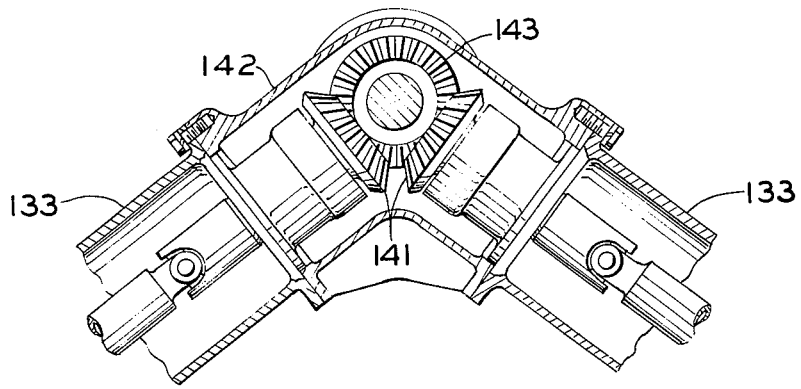
Figure 17:
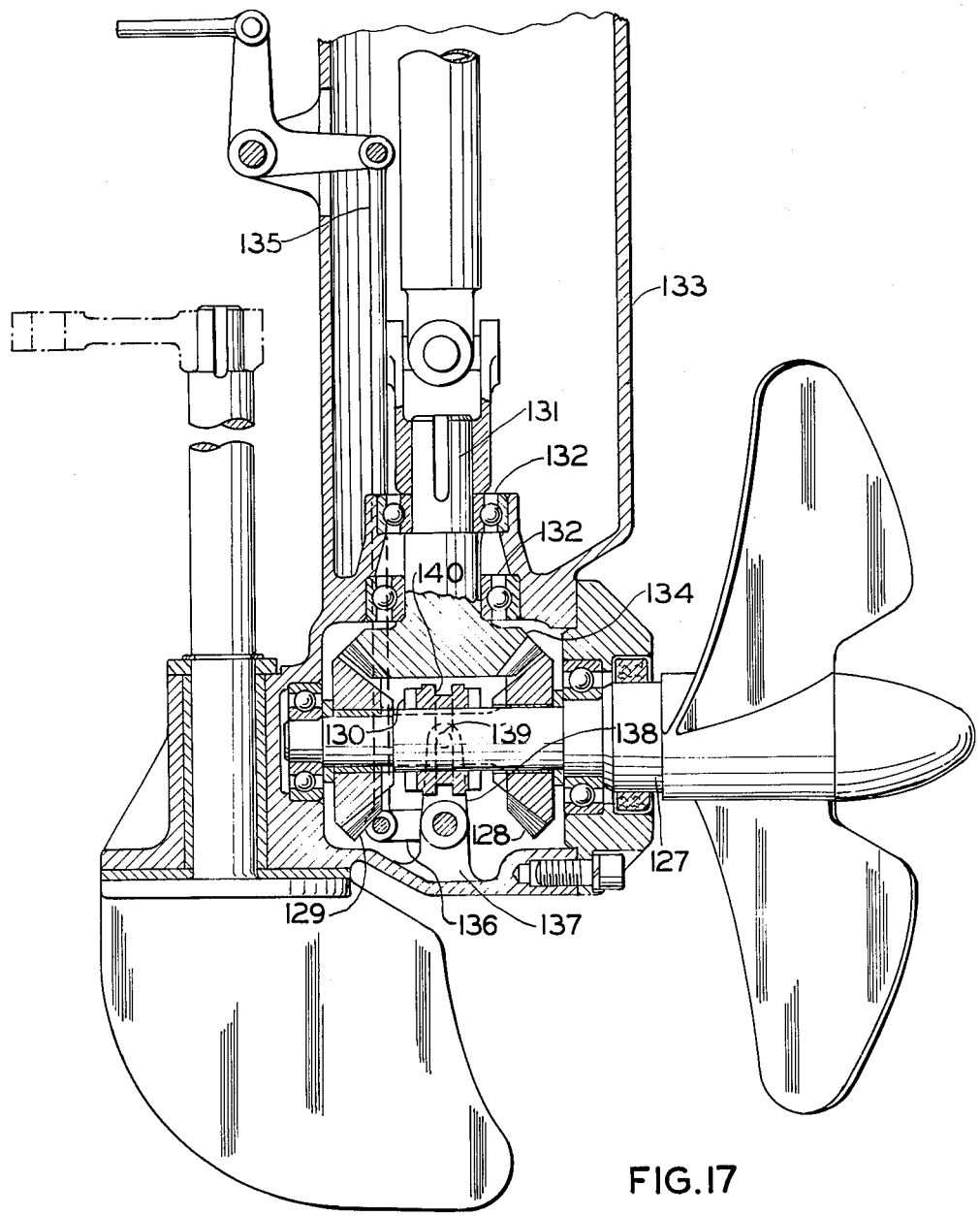

In the drawings:
FIGURE 1 is a diagrammatic, elevational view of a marine craft provided with a propulsion system of this invention adapted for full inboard installation.
FIGURE 2 is a diagrammatic top plan view further illustrating the installation of the propulsion system.
FIGURE 3 is a schematic diagram of a hydraulic control system for the propulsion system.
FIGURE 4 is an enlarged, horizontal, sectional view of the control gear mechanism arranged in neutral and the propeller shaft and gear connections.
FIGURE 5 is a sectional view of the control gear mechanism similar to FIGURE 4 showing the gears associated with each propeller intermeshed for simultaneous forward operation.
FIGURE 6 is a sectional view similar to FIGURE 5 showing the gears intermeshed for simultaneous reverse operation.
FIGURE 7 is an enlarged, vertical, transverse, sectional view taken along line 7—7 of FIGURE 4.
FIGURE 8 is an enlarged, vertical, transverse, sectional view taken along line 8—8 of FIGURE 5.
FIGURE 9 consists of diagrammatic views of the thrust combinations obtainable with the propulsion system.
FIGURE 10 is an elevational view of the stern of a boat having installed thereon a modification of the propulsion system in which the control gear mechanism is adapted for mounting on the transom.
FIGURE 11 is an elevational view of the stern of a boat illustrating a second modification of the propulsion system in which the control gear mechanism is adapted for mounting on the transom.
FIGURE 12 is an enlarged, medial, sectional view of the gear mechanism of FIGURE 10.
FIGURE 13 is an enlarged, medial, sectional view of the power dividing gear mechanism of FIGURE 11.
FIGURE 14 is an enlarged, sectional view taken along line 14—14 of FIGURE 12.
FIGURE 15 is an end view of the gear mechanism of FIGURE 14 with the propeller shaft casting removed.
FIGURE 16 is a medial sectional view of the right angle gear head of a propeller housing taken along line 16—16 of FIGURE 10.
FIGURE 17 is a medial sectional view of the right angle gear head and directional control mechanism taken along line 17—17 of FIGURE 11.

Having reference to the drawings, FIGURES 1-8, inclusive, illustrate an inboard installation of the propulsion system of this invention in a typical marine craft 10. The propulsion system comprises in general a marine engine 11, a pair of propellers 12, and the power transmission mechanism of this invention, denoted generally by the numeral 13, which is selectively operable to interconnect the engine and propellers as desired. Utilization of the power transmission mechanism 13 permits the location of the relatively heavy engine 11, which may be of the well known internal combution gasoline or diesel type, within the hull at the point where optimum weight distribution may be obtained. As will be readily apparent from the subsequent detailed description of this propulsion system, the engine 11 may also be disposed with the crankshaft oriented relative to the hull for optimum operation irrespective of the location and alignment of the propellers 12. In this installation, the engine 11 is provided with a drive shaft 14 which extends rearwardly from the engine and mechanically couples the engine to the power transmission mechanism 13. The propellers 12, which are preferably of opposite pitch to eliminate torque effects, are carried on their respective propeller shafts 15. These shafts 15 are supported adjacent the propellers 12 by hanger assemblies 16 attached to the hull to properly position the propellers at the stern of the craft and the shafts extend interiorly of the hull through suitable stuffing boxes 17. Each inboard end of the propeller shafts 15 is operatively connected to the power transmission mechanism 13 as will be more fully explained hereinafter.

The craft 10 is provided with the usual rudder type steering device 18 for directional control when the craft is under way at normal cruising speeds. A helmswheel 19 for control of the rudder 18 is provided in the cockpit and is connected to the rudder by a standard cable system. Also located in the cockpit are the manually operated controls 20 for the power transmission mechanism 13 as are other necessary controls for the engine 11 (not shown).

In accordance with this invention, the power transmission mechanism 13 includes a novel gear mechanism 21 which permits selective operation of each propeller 12 as well as effecting selective, independent reversing of each propeller. The gear mechanism 21, as is best shown in FIGURES 4–8, inclusive, comprises a rigid housing 22 into which the drive shaft 14 extends and a gear system for connecting two diametrically disposed, laterally extending output shaft assemblies 23. Each output shaft assembly 23 is coupled to its respective propeller 12 through a right angle propeller shaft gear head 25. The housing 22 is open topped and is provided with a removable cover plate 22a (see FIGURES 7 and 8).

The input drive shaft 14 extends through an opening 27 in the forward wall and across the housing 22 with the end thereof journalled in a bearing 28 supported on the rear wall of the housing. The engine 11 provides the necessary support for the forward end of the shaft 14. A shaft seal 29 mounted on the shaft 14 adjacent the opening 27 is secured to the housing and forms an oil-tight seal between the shaft and housing. Fixed on the shaft 14 within the housing 22 in axially spaced, opposed relationship are a pair of identical bevel gears 30 and 31. Each output shaft assembly 23 includes a stub shaft 32 terminating adjacent the drive shaft 14 having a bevel gear 33 fixed thereon which is adapted to intermesh with gears 30 and 31. The gears 33 are appropriately sized relative to the spacing of the gears 30 and 31 in order that neither gear 30 or 31 will be engaged by the gears 33 when disposed intermediately thereof as shown in FIGURE 4.

Each output shaft assembly 23 also includes a double bearing journal box 34 for rotatably supporting the stub shaft 32. The double bearing journal boxes 34, which are the sole support for the stub shafts, are necessary to prevent misalignment of the shafts as they are subjected to radial as well as axial and torsional loads. Supporting each journal box 34 is a bifurcated arm 35 having a shaft 36 interconnecting the opposed members of the arm at the end opposite the journal box 34 (see FIGURES 7 and 8). The shaft 36 is journalled in a bearing block 37 secured to the bottom wall of the housing 22. The arms 35 are of a length to support the stub shafts 32 for movement about an arc whereby the gears 33 will properly mesh with each of the gears 30 and 31. To prevent pivotal movement beyond the desired arc which would result in improper meshing, the bearing block 37 is provided with a pair of lugs 38 which have opposed, relatively inclined, upwardly diverging edges 39 to engage the edge portions of the arms 35 at the extreme limit of their pivotal movement and thus form rigidly fixed stops.

Attached to the outer ends of each stub shaft 32 is an elongated shaft 40 which extends through a slot 41 formed in the end wall of the housing 22. Shaft 40 is attached to the stub shaft 32 by a flexible coupling member 42 having a section thereof rigidly connected to the stub shaft. Shaft 40 is keyed to the other section of the coupling 42 but is relatively movable axially. The opposite end of the shaft 40 is connected by a second flexible coupling 43 to a driving member 44 of the associated gear head 25. The sections of the coupling 43 are rigidly fixed to their respective portions of the shaft 40 and the driving member 44 and, since the gear heads 25 are mounted in a fixed position within the hull of the craft, the sliding connection of the shaft 40 and coupling 42 permits axial extension of the shaft connection occasioned by arcuate displacement of the output shaft assemblies 23. The slots 41 may be of arcuate form to accommodate the arcuate movement of stub shafts 32 and associated couplings 42.

A plate 45 is disposed in parallel sliding relationship to the interior surface of each end wall of the housing 22 and is formed with an opening for receiving the section of the coupling 42 fixed on the stub shaft 32. An oil seal 46 mounted on the coupling section is carried in a flanged recess 47 formed on the inner surface of the plate 45 permitting rotation of the coupling section in the opening in the plate while preventing leakage of oil therethrough. The plate 45 is guided at the lower edge by a channel form track 48 attached to the housing end wall. Thus, the plate 45 will not be able to rotate with the coupling section as a result of the frictional resistance between the oil seal 46 and the coupling 42. An O ring sealing member 49 extending around the opening 41 is preferably disposed between the plate 45 and the housing end wall in a groove formed in the end wall preventing leakage of oil between the plate and housing.

Swinging movement of each output shaft assembly 23 is controlled by a spring centered, positioning device 50. The device includes a pair of opposed pistons 51 and a double-ended cylinder 52 reciprocably mounted on the pistons. The cylinder 52 comprises an elongated casting which is disposed between the spaced members of the arm 35 intermediate the shaft 36 and the journal box 34. A shaft 53 extending transversely between the arm members also extends through a bore formed in the cylinder. The shaft 53 engages the respective arm members at each end thereof. Formed in each end of the cylinder 52 is a cylindrical bore adapted to receive a piston 51. Each of the pistons 51, which are of elongated cylindrical form, are provided at one end with a threaded extension 54 which projects through an opening in the front or rear wall of the housing 22. Threaded on each piston extension 54 is a nut 55 which is tightened against the exterior surface of the housing wall and rigidly supports the piston.

An O ring seal 56 is disposed in an annular groove formed in the piston 51 at the opposite end and forms an oil-tight seal with the bore of the cylinder 52 substantially preventing leakage and consequent loss of pressure. Extending axially through the pistons 51 and their extensions 54 is a bore 57 which is open at each end for the passage of a hydraulic fluid or oil into the cylinder bore. A second oil seal 58 disposed in annnular groove formed in the wall of the cylinder bore adjacent the outer end also forms an oil-tight seal with the piston 51 and prevents the leakage of hydraulic fluid from the cylinder 52 as well as the entrance of lubricating oil with which the housing 22 is substantially filled. The small amount of hydraulic fluid leakage past the O ring seal 56 occasioned by reciprocating movement of the piston 51 in the cylinder bore is removed and returned to the reservoir of the hydraulic system. A drilled passage 59 extending longitudinally through the wall of the cylinder 52 and communicating with each of the bores adjacent the seals 58 is connected to the reservoir through a leakage return line 60. The opposite ends of the passage 59 are closed to prevent entrance of lubricating oil.

Centering of the reciprocably mounted cylinder 52 is accomplished by a pair of compression springs 61. The compression springs 61 are disposed about the piston 51 and adjacent marginal end of the cylinder 52. One end of each spring 61 contacts the interior surface of the respective housing wall and the opposite end contacts a radially extending annular flange or rib 62 formed on the surface of the cylinder 52.

In a neutral or inoperative position, the output shaft assemblies 23 are centered as shown in FIGURES 4 and 7. In each instance, the arms 35 is substantially vertically disposed with the respective bevel gear 33 not meshed with either gear 30 or 31 of the drive shaft 14. The hydraulic control system, to be subsequently described in detail, is operated to remove all hydraulic fluid pressure from the cylinders 52 and pistons 51. The springs 61 which exert an equal but opposite force on the cylinder 52 will therefore position the output shaft assembly 23 in a center or neutral position.

Engagement of an output shaft assembly bevel gear 33 with either of the continuously driven drive shaft gears 30 or 31 will cause rotation of the stub shaft 32. Which gears are intermeshed will determine the direction of rotation of the stub shaft 32 and the associated propeller 12 since meshing of gear 33 with the gear 31 will produce an opposite rotation to that produced by intermeshing gear 33 with gear 30. Intermeshsing of the desired gears is readily accomplished by increasing the hydraulic fluid pressure in the appropriate cylinder bore to such an extent as to overcome the counteracting force of the spring 61. As previously indicated, the swinging movement of the arm 35 is limited by the engagement thereof with the edges 37 of the stop lugs 38. Upon the subsequent removal of the pressure from the cylinder, the output shaft assembly will return to center thus disengaging the gears.

A synchronizing mechanism is also provided to reduce the noise and extreme stress produced when meshing the bevel gears 33 of the output shaft assemblies 23 with either of the drive shaft gears 30 and 31. This mechanism includes a collar 63 and a helical coil type compression spring 64 mounted on the drive shaft 14 between the two bevel gears 30 and 31. Two collars 63 and springs 64 are mounted on the drive shaft 14 to effect synchronization with either gear 30 or 31. The collar 63 consists of a hub splined to the drive shaft 14 for axial movement relative thereto and an annular flange 65 having a friction producing surface arranged in opposing relationship to the flange of the other collar. The spring 64 is disposed between the flange 65 of the respective collar and an adjacent bevel gear, 30 or 31, to urge the collar toward the other. Preferably, a portion 66 of the drive shaft 14 intermediate the gears 30 and 31 is enlarged in diameter forming a shoulder relative to the splined section on which the collars 63 are mounted and which is normally engaged by the collar flanges 65. The length of the enlarged drive shaft portion 66 is such that the flanges 65 will be relatively spaced a distance substantially greater than the diameter of the stub shafts 32 which project a distance inwardly of the respective gears 33 toward the drive shaft 14. When an output shaft assembly 23 is pivoted to intermesh the gear 33 thereof with either gear 30 or 31, the shaft 32 will engage the collar flange 65 prior to meshing of the gears. Since the collars 63 are also continuously rotated, the frictional engagement of the flange 65 with the shaft 32 will impart a rotation to the previously stationary shaft 32 thereby reducing the relative difference in speed of the bevel gears 30 and 31 and the bevel gear 33. As is clearly shown in FIGURES 5 and 6, the shaft 32 will cause axial movement of the collar 63 and compression of the spring 64.

The two right angle propeller shaft gear heads 25, which are of identical construction, include a housing 67 adapted to receive the inboard end of the respective propeller shaft 15. The propeller shaft 15 is journalled in a pair of bearings 68 and 69 mounted on opposed interior walls of the housing 67. A bevel gear 70 mounted on the propeller shaft 15 is meshed with a similar bevel gear 71 mounted on the driving member 44. The driving member 44 comprises a short shaft journalled in a bearing 72 carried by a removable plate 73 attached to the housing 67. Oil seals 74 and 75 are provided at the openings in the housing 67 and plate 73 through which the shafts extend.

The hydraulic control system for the operation of the gear mechanism 21, diagrammatically shown in FIGURE 3, includes a gear pump 76 for supplying the hydraulic fluid under pressure. The pump 76 is exteriorly mounted on the rear wall of the housing 22 and is driven by the drive shaft 14 which is coupled to the pump through the shaft 77 thereof. A suction line 78 of the pump is connected to a reservoir 79 and the pressure line 80 is connected to a pressure regulating valve 81. The pressure line 80 is also connected to the inlet ports of two independently operated, manually controlled four-way valves 82 and 83. A fluid return port of each valve, 82 and 83, is also connected to the reservoir 79. Two additional ports of each valve are connected to the respective piston extensions 54 of each of the positioning devices 50 by the lines 84, 85, and 86, 87. The valves 82 and 83 are preferably of the type in which the pressure port is blocked and the lines 84, 85 and 86, 87 are connected to the return port in the center position. When actuated to either of the other two positions, the valves are operative to pressurize the fluid in one of the cylinder bores to effect pivotal displacement of the output shaft assemblies 23. For convenience of operation, the two valves 82 and 83 are also mounted in the cockpit adjacent the helmswheel 19 (see FIGURES 1 and 2).

In the diagrammatic views a–i, inclusive, of FIGURE 9, the directional control over the marine craft that can be obtained by the propulsion system of this invention is clearly demonstrated. In view 9a, the output shaft assemblies 23 for both propellers are in the center or neutral position and the craft will remain stationary. For moving the craft ahead (FIG. 9b), the valves 82 and 83 are operated to intermesh the starboard propeller gear 33 with gear 30 and the port propeller gear 33 with gear 31. Thus, the shafts 40 will be rotated in the same direction and the craft will move ahead since the propellers 12 are of opposite pitch. Engaging the respective gears 33 with the opposite drive shaft gears 30 and 31 as shown in view 9c, the propellers 12 will be rotated in a reverse direction producing a reverse thrust. A sharp starboard or port turn, see views 9d and 9g, respectively, may be obtained by intermeshing both gears 33 with either gear 30 or 31 as desired. Both propellers will then be rotated in the same direction but will produce opposite thrusts. Similarly, a shallow starboard or port turn may be executed as indicated in views 9e and 9h, respectively, by only driving one of the propellers 12. In view 9e, the port propeller is driven to provide forward thrust and, in view 9h, the starboard propeller is driven to provide forward thrust. By driving the starboard or port propeller in a reverse direction as in views 9f and 9i, respectively, the craft will make either a shallow starboard or port turn while backing. Thus, the craft may be readily maneuvered at slow speeds where the rudder is relatively inoperative by means of the propulsion system of this invention.

The modification illustrated in FIGURES 10, 12, 14, 15 and 16 is adapted for outboard installations where the engine is of the inboard type. In this modification, the gear mechanism housing 90 is modified for mounting on the transom 91 of a marine craft 92 and includes a drive shaft 93 having a coupling flange 94 fixed on the inboard end thereof for connecting with the engine (not shown). The drive shaft 93 is similarly journalled in a pair of bearings 95 carried by the housing 90. Attached to the housing 90 by means of bolt flanges are two tubular castings 96 which are arranged to project angularly downward and support the propellers 97 at the desired position beneath the hull of the craft. Each propeller 97 is mounted on its respective shaft 98 which is journalled in a pair of bearings 98a carried at the lower end of the casting 96 (see FIGURE 16). The castings 96 provide the sole support for the propellers 97 as well as a rudder 99. The rudders 99 are each attached to a shaft 100 journalled in a bearing casting 101 integrally formed with the casting 96 at the lower end thereof and extend vertically upward. Fixed on the upper end of each rudder shaft 100 is a lever arm 102 which is connected to cables 103 and 104 of the steering apparatus. A rigid bar 105 is also connected to the lever arm 102 to complete the connection of the steering apparatus.

Connection of the drive shaft 93 to each of the propellers 97 is obtained through a gear mechanism substantially identical with that previously described. This mechanism includes an output shaft assembly 106 for each propeller 97 comprising a pivotally mounted member 107 and a shaft 108 formed with a bevel gear 109 at one end thereof. The shaft 108 is journalled in a pair of bearings 108a carried by the member 107. The member 107 is pivotally mounted on a shaft 110 located eccentrically to the shaft 108. Swinging movement of the member 107 will thus cause the gear 109 to mesh with either of a pair of bevel gears 111 and 112 fixed in relatively spaced relationship on the drive shaft 93. The member 107 is also formed with a flange 120 adapted to engage the surface of a bearing member 121 which assists in supporting the output shaft assembly 106 in properly aligned relationship to the drive shaft 93. The bearing member 121 is carried at the upper end of the casting 96. Swinging movement of the output shaft assembly 106 is effected by a hydraulic positioning mechanism 122 similar in construction and operation to that previously described. The cylinder 123 of the positioning mechanism 122 is connected to the member 107 by a pivot pin 124. A pair of adjustable stops 107a are provided to restrict movement of the output shaft assembly.

A shaft 113 connected to the shaft 108 by a flexible coupling 114 extends downwardly through the casting 96 to the lower end thereof. This end of the shaft 113 is connected by a flexible coupling 115 to a stub shaft 116 which is rotatably mounted in the lower end of the casting 96 by a pair of bearings 117. Integrally formed with the stub shaft 116 is a bevel gear 118 which is intermeshed with a similar bevel gear 119 fixed on the propeller shaft 98.

A second modification of the propulsion system, also adapted for outboard mounting on the transom 125 of a marine craft 126 is illustrated in FIGURES 11, 13 and 17. This modification is similar in form to the modification previously described but is designed for mechanical operation. The propeller shaft 127 of this modification carries a pair of bevel gears 128 and 129 which are rotatably mounted thereon in relatively spaced relationship. A clutch member 130 also mounted on the shaft 127 between the gears 128 and 129 is keyed thereto for axial sliding movement. The opposite end faces of the clutch member 130 are formed with teeth for operatively engaging similar teeth formed on the adjacent end faces of the gears 128 and 129. An input drive shaft 131 journalled in a pair of bearings 132 mounted in the tubular casting 133 is provided with a bevel gear 134 at the lower end thereof. The gear 134 is simultaneously intermeshed with both propeller shaft gears 128 and 129.

A driving connection between the drive shaft 131 and the propeller shaft 127 is obtained by axially shifting the clutch 130 engagement with the desired gear 128 or 129. Movement of the clutch 130 is effected through a mechanical linkage including a connecting rod 135 and a bell crank 136. The connecting rod 135 is operatively coupled to a manually operated control apparatus (not shown) located within the hull of the craft. The bell crank 136 is pivotally mounted on a support 137 secured to the interior of the casting 133. One arm 138 of the bell crank is divided to receive the clutch 130 therebetween and is provided with a pair of pins 139 that engage an annular groove 140 formed in the clutch.

The drive shaft 131 extends upwardly through the casting 133 and is coupled to a bevel gear 141 journalled in the housing 142. Gear 141 meshes with a similar bevel gear 143 driven by the engine (not shown) which is of the inboard type. Operation to effect steering control is substantially similar to that previously described in detail.

The propulsion system of this invention has been described in detail for marine applications; however, it is readily apparent that the system may be easily adapted to other applications. For example, the propulsion systems may be conveniently adapted for utilization with land vehicles where independent operation of a pair of driving members is desired for increased maneuverability. The constructional modifications necessary for such an installation will be simple and obvious in view of the detailed description of the present application.

It is readily apparent that the propulsion system of this invention greatly facilitates maneuverability of the craft and provides more accurate control at slow speeds where a rudder is relatively ineffective. The apparatus is simple in construction and may be conveniently installed in marine craft of present design without extensive modification of the hull. The advantages of twin propeller operation are obtained with only one engine thus avoiding the complicated control mechanisms required for the twin engine types. The apparatus may be economically fabricated and installed and is simple to operate.

In accordance with the provisions of the patent statutes, the principles of this invention have ben fully explained and illustrated and described in detail. However, it is to be understood that, within the scope of the appended claims, the invention may be practiced otherwise than as specifically illustrated and described.

Having thus described this invention, what is claimed is:

1. A mechanical-drive coupling apparatus comprising an input drive shaft, at least two independent power output shafts, and a coupling apparatus interposed between said input drive shaft and said output shafts for independently connecting each of said output shafts to said input drive shaft, said coupling apparatus including a pair of bevel gears fixed on said input drive shaft in spaced apart relationship, a pair of shaft members rotatably supported normal to said drive shaft and which are each mechanically connected to a respective one of said output shafts and are each provided with a bevel gear adapted to cooperatively intermesh with said first mentioned bevel gears carried by said input drive shaft, each of said shaft members being supported for displacement along the axis of said input drive shaft to bring the respective bevel gear into meshing engagement with the selected drive shaft bevel gear, and means connected with each of said shaft members operative to selectively and independently engage the respective bevel gear with the desired drive shaft gear.

2. A mechanical-drive coupling apparatus according to claim 1 wherein each of said shaft members is supported by an arm pivotally mounted to permit swinging movement of the respective shaft member to either of the gear intermeshing positions.

3. A single engine, twin propulsion drive system for a vehicle comprising a driving engine; at least two propelling means carried by the vehicle, each of which is independently effective in producing movement of the vehicle; and coupling apparatus interposed between said engine and said propelling means for independently connecting each of said propelling means to said engine, said coupling apparatus including a gear mechanism having an input drive shaft connected to said engine for the rotation thereof and provided wtih gear means, said input drive gear means including two similar gears fixed on said drive shaft and axially spaced apart thereon, each of said gears being of the bevel type and mounted on said drive shaft with the face thereof in opposed relationship to the other gear, a pair of output shaft assemblies with each assembly being mechanically coupled to one of said propelling means and provided with gear means cooperatively engageable with said drive shaft gear means, each of said output shaft assemblies including a shaft mechanically coupled to a respective propelling means and rotatably supported by a bearing member and movable axially of said input drive shaft to cause engagement of said gear means, said gear means including a bevel-type gear fixed on said shaft and being adapted to cooperatively and selectively engage each gear of said drive shaft gear means, said drive shaft gear means and said output shaft assembly gear means being selectively operable to drive said propelling means in either of opposite directions, and a positioning device mechanically coupled to each of said output shaft assemblies which is selectively operable to form a driving connection between said input drive shaft gear means and the respective output shaft assembly gear means, said positioning device including control means for controlling the operation thereof.

References Cited by the Examiner

UNITED STATES PATENTS

| | | | |
|---|---|---|---|
| 2,255,773 | 9/1941 | Heftler | 74—665 |
| 2,311,393 | 2/1943 | Honeywell | 74—355 |
| 2,718,792 | 9/1955 | Kiekhaefer | 74—378 |
| 3,107,554 | 10/1963 | Polak et al. | 74—720.5 |
| 3,112,728 | 12/1963 | Krause | 74—665 |
| 3,118,323 | 1/1964 | Schwartz | 74—720.5 |

FOREIGN PATENTS 309,400    11/1918    Germany.

DAVID J. WILLIAMOWSKY, *Primary Examiner.*

DON A. WAITE, *Examiner.*

H. S. LAYTON, *Assistant Examiner.*